US008458677B2

(12) United States Patent
Gschwind

(10) Patent No.: US 8,458,677 B2
(45) Date of Patent: Jun. 4, 2013

(54) GENERATING CODE ADAPTED FOR INTERLINKING LEGACY SCALAR CODE AND EXTENDED VECTOR CODE

(75) Inventor: Michael K. Gschwind, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 958 days.

(21) Appl. No.: 12/544,258

(22) Filed: Aug. 20, 2009

(65) Prior Publication Data

US 2011/0047533 A1 Feb. 24, 2011

(51) Int. Cl.
*G06F 9/44* (2006.01)
*G06F 9/45* (2006.01)

(52) U.S. Cl.
USPC ................ 717/140; 717/106; 717/162

(58) Field of Classification Search
USPC .................... 717/140, 106, 162
See application file for complete search history.

(56) References Cited

U.S. PATENT DOCUMENTS

| 4,837,730 | A | 6/1989 | Cook et al. |
| 5,418,975 | A | 5/1995 | Babaian et al. |
| 5,940,621 | A * | 8/1999 | Caldwell ............. 717/156 |
| 6,199,202 | B1 * | 3/2001 | Coutant et al. ........ 717/138 |
| 6,205,247 | B1 | 3/2001 | Breuer et al. |
| 6,839,828 | B2 | 1/2005 | Gschwind et al. |
| 7,350,057 | B2 | 3/2008 | Barlow et al. |
| 2004/0177346 | A1 | 9/2004 | Cannon et al. |
| 2004/0226004 | A1 * | 11/2004 | Oldman ............... 717/136 |
| 2005/0240644 | A1 | 10/2005 | Van Berkel et al. |
| 2007/0168954 | A1 * | 7/2007 | Strom .................. 717/118 |
| 2010/0058302 | A1 * | 3/2010 | Broscaru et al. ......... 717/151 |

OTHER PUBLICATIONS

U.S. Appl. No. 12/023,720, filed Jan 31, 2008, Gschwind, Michael K., et al.
U.S. Appl. No. 12/134,495, filed Jun 6, 2008, Eichenberger, Alexandre E., et al.
U.S. Appl. No. 12/250,575, filed Oct 14, 2008, Gschwind, Michael K.
U.S. Appl. No. 12/250,581, filed Oct 14, 2008, Gschwind, Michael K.
U.S. Appl. No. 12/250,584, filed Oct 14, 2008, Eichenberger, Alexandre E., et al.
U.S. Appl. No. 12/250,599, filed Oct 14, 2008, Eichenberger, Alexandre E., et al.

(Continued)

*Primary Examiner* — Li B Zhen
*Assistant Examiner* — Hang Pan
(74) *Attorney, Agent, or Firm* — Stephen J. Walder, Jr.; William Stock

(57) ABSTRACT

Mechanisms for intermixing code are provided. Source code is received for compilation using an extended Application Binary Interface (ABI) that extends a legacy ABI and uses a different register configuration than the legacy ABI. First compiled code is generated based on the source code, the first compiled code comprising code for accommodating the difference in register configurations used by the extended ABI and the legacy ABI. The first compiled code and second compiled code are intermixed to generate intermixed code, the second compiled code being compiled code that uses the legacy ABI. The intermixed code comprises at least one call instruction that is one of a call from the first compiled code to the second compiled code or a call from the second compiled code to the first compiled code. The code for accommodating the difference in register configurations is associated with the at least one call instruction.

19 Claims, 9 Drawing Sheets

OTHER PUBLICATIONS

Ganesan, Girish et al., "Achieving Optimum Coded Diversity with Scalar Codes", IEEE Transactions on Information Theory, vol. 47, No. 5, Jul. 2001, pp. 2078-2080.

Hoxey, Steve et al., "The PowerPC Compiler Writer's Guide", IBM Corporation, 1996, http://cr.yp.to/2005-590/powerpc-cwg.pdf, 264 pages.

* cited by examiner

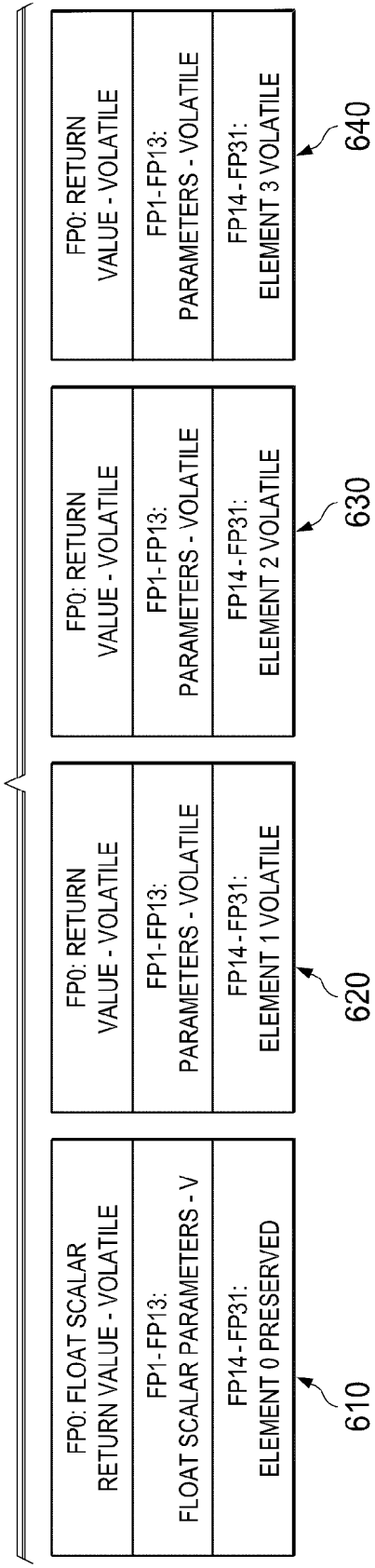

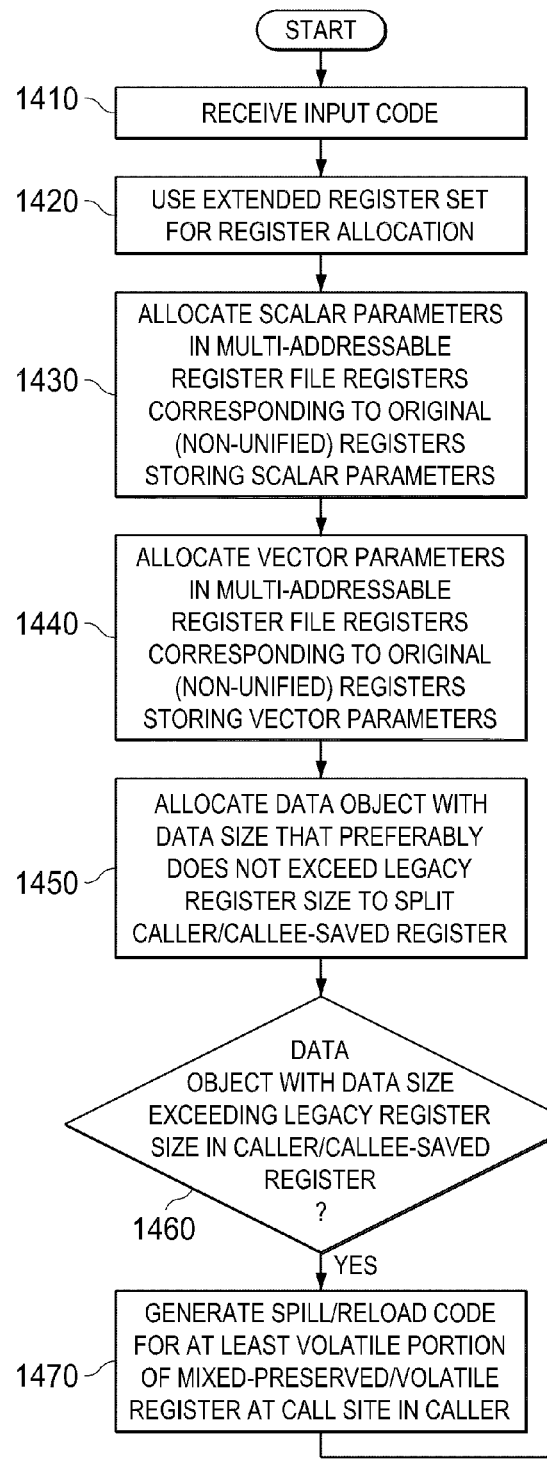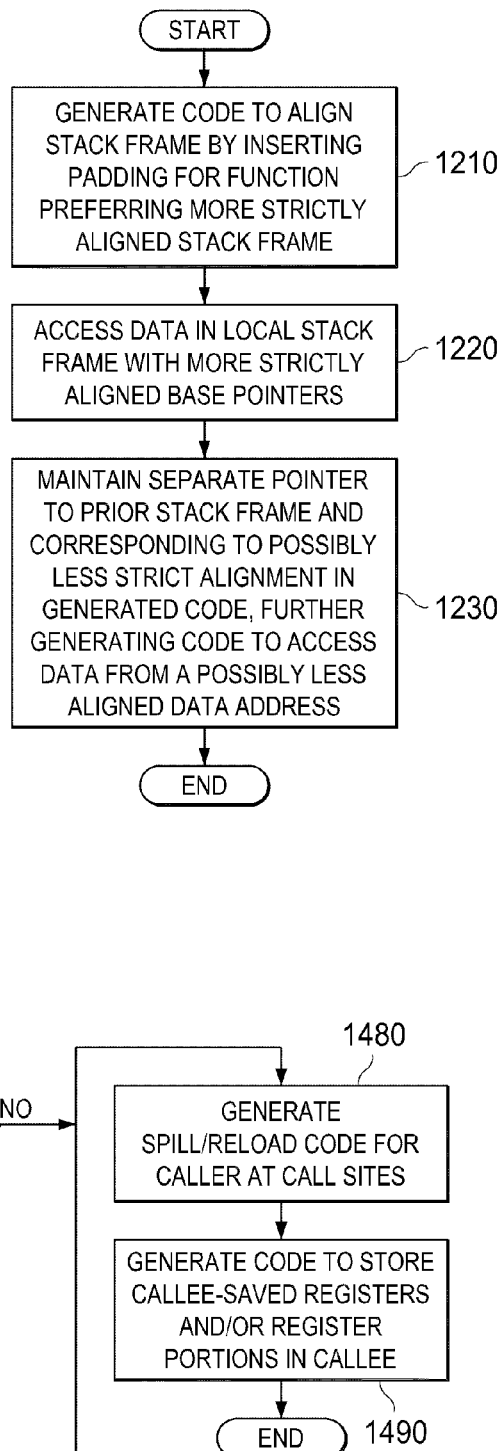

GENERATING CODE ADAPTED FOR INTERLINKING LEGACY SCALAR CODE AND EXTENDED VECTOR CODE

This invention was made with United States Government support under Contract No. B554331 awarded by the Department of Energy. The Government has certain rights in this invention.

BACKGROUND

The present application relates generally to an improved data processing apparatus and method and more specifically to mechanisms for generating code adapted for interlinking legacy scalar code and extended vector code.

Single Instruction Multiple Data (SIMD) is a technique utilized in processor architectures to achieve data level parallelism. The SIMD technique essentially means that the processor operates the same instruction on multiple data, thereby achieving parallel operation. SIMD is used in most vector units of vector computing devices. Scalar processors operate using a Single Instruction Single Data (SISD) technique in which the processor operates a single instruction on a single piece of data.

As an example, SIMD techniques may be used as a way of packing N (usually a power of 2) like operations, e.g., 8 add operations, into a single instruction. The data for the instruction operands is packed into registers capable of holding the extra data. The 8 add operations are then performed on the data as part of executing the single instruction. Thus, for the cost of doing a single instruction, N instructions worth of work are actually performed. This can result in increased processing speeds for parallelizable code.

Both the PowerPC™ architecture, available from International Business Machines Corporation of Armonk, N.Y., and the IA-32 architecture, available from Intel Corporation, have SIMD extensions to their vector architectures. On PowerPC, the extension is called AltiVec™. On the IA-32 architecture, the vector architecture extensions have been gradually introduced, at first as the Intel MultiMedia eXtensions (MMX) and then later as the Intel Streaming SIMD Extensions (SSE, SSE2, SSE3). Examples of common areas where SIMD can result in very large improvements in speed are 3-D graphics, image processing, video processing, theater-quality audio, high performance scientific calculations, and the like. SIMD units are present on all G4, G5 or Intel Pentium 3/4/M class processors.

While SIMD provides great performance improvements over traditional scalar approaches to executing code, not all code supports parallelization in SIMD and some legacy code is only available for scalar execution. That is, since the prior architectures focused on scalar execution, i.e. SISD, many legacy applications are not able to be executed using SIMD parallelization and are not compatible with newer SIMD code or are only currently offered as scalar code and it is too costly to recode the scalar code for use in a SIMD or vectorized environment. However, users may wish to take advantage of legacy applications without having to recode these applications for the new SIMD architecture. Furthermore, users may wish to use such legacy applications in connection with newer SIMD code. Currently, there are no mechanisms for allowing such interlinking of scalar and vector code, i.e. SIMD code.

SUMMARY

In one illustrative embodiment, a method, in a data processing system, for intermixing code is provided. The method comprises receiving, in a compiler executing on a processor of the data processing system, source code for compilation using an extended Application Binary Interface (ABI) that extends a legacy ABI and uses a different register configuration than the legacy ABI. The method further comprises generating, by the compiler executing on the processor, first compiled code, based on the source code, the first compiled code comprising code for accommodating the difference in register configurations used by the extended ABI and the legacy ABI. The method also comprises intermixing, by a linker executing in the data processing system, the first compiled code and second compiled code to generate intermixed code. The second compiled code is compiled code that uses the legacy ABI. In one illustrative embodiment, the intermixed code comprises at least one call instruction that is one of a call from the first compiled code to the second compiled code or a call from the second compiled code to the first compiled code. In such an embodiment, the code for accommodating the difference in register configurations is associated with the at least one call instruction. Moreover, the method comprises outputting, by the linker, the intermixed code.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment. In one illustrative embodiment, the system/apparatus may further comprise a multi-addressable register file coupled to the one or more processors. The multi-addressable register file may have a plurality of vector-scalar registers configured to store both data formatted for use with a legacy Application Binary Interface (ABI) corresponding to legacy scalar code and data formatted for use with an extended ABI corresponding to the vector code.

These and other features and advantages of the present invention will be described in, or will become apparent to those of ordinary skill in the art in view of, the following detailed description of the exemplary embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 5 is an example diagram of a known ABI, utilized in scalar processor architectures, which illustrates the conventions for management of specific registers at the procedure call interface;

FIG. 6 is an example diagram of an extended ABI that extends floating point values to 256 bits;

FIG. 12 is an example diagram illustrating an example stack alignment compilation operation in accordance with one illustrative embodiment;

FIG. 14 is a flowchart outlining an example operation for performing compilation of source code to generate new enhanced function code such as to allow inter-linkage and generation of mixed old/new code in a single executable code in accordance with one illustrative embodiment.

DETAILED DESCRIPTION

Figure 1:
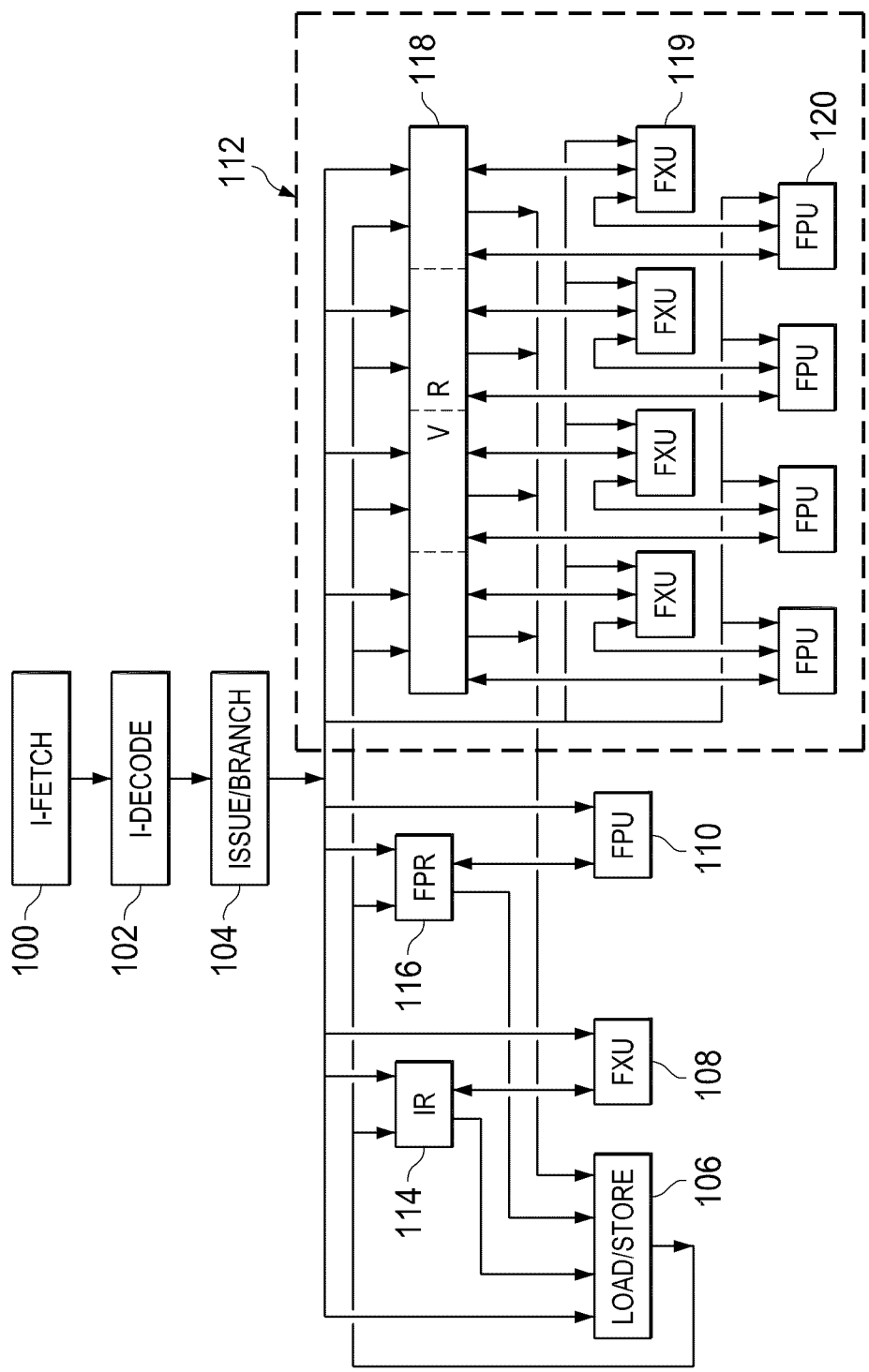
FIG. 1 is a block diagram depicting an example of a prior art processor containing both scalar processing units and a SIMD unit for processing structured data types.

In order to address some of the limitations noted above, the illustrative embodiments provide mechanisms for interlinking scalar code and extended vector code, such as single instruction multiple data (SIMD) code. With the mechanisms of the illustrative embodiments, scalar code may be executed virtually unchanged with extended vector code. With the illustrative embodiments, a compatible data representation at the interfaces between scalar code and extended vector code, and compatible calling mechanisms to allow scalar code to call extended vector code and vice versa, are provided. The extended vector code implements the compatible data representation and calling mechanisms so as to work with legacy scalar code. As a result, scalar code may be executed along with extended vector code, e.g., SIMD code, with each being able to call the other and pass and utilize data generated by the other.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 is a block diagram depicting an example of a prior art processor containing both scalar processing units and a SIMD unit for processing structured data types, the SIMD unit comprising multiple processing units for each element in the structured data type. This processor implementation is exemplary of prior art systems. In some implementations, some register files may be shared, e.g., a combined integer and floating point register file, or additional register files may be present, such as a condition register file or a predicate register file for comparison results. However, in general, the use of separate scalar and SIMD processors is inefficient and expensive in that such a configuration includes a number of redundant functional units and data paths. Furthermore, such implementations result in an undesirable amount of power consumption since while either the scalar or SIMD unit is processing data, the other is generally sitting idly by, awaiting its next instruction, but all the while consuming system power.

During operation of the system of FIG. 1, instructions are fetched by instruction fetch unit 100, and supplied to an instruction decode unit 102. Decoded instructions are passed to an issue/branch unit 104, where branch instructions are resolved and other instructions can be stored in the instruction issue unit thereof (not shown) until they can be executed in one of the functional units of the processor. The instruction issue unit can contain prediction logic, instruction reordering logic, instruction issue buffers and other logic supporting the high-performance issuing of instructions.

Instructions are issued by the issue/branch unit 104 to one or more of the load/store unit 106, the fixed-point unit 108, the floating-point unit 110, or the SIMD processing block 112. Before instructions can be processed by one or more of the processing units, one or more register accesses are usually required in a register file, e.g., the integer register file 114, the floating point register file 116, or the vector register file 118 which is a part of the SIMD multimedia extension found in many contemporary processors.

The SIMD multimedia processing block 112 typically contains a vector register file 118 for storing structured data (usually a vector consisting of four elements). The vector register file 118 may be segmented into four sub-register files, each storing a single field of the structured data. The SIMD multimedia processor block 112 may contain several types of function units, each type being replicated for the number of elements in the structured data type supported by the multimedia extension. In FIG. 1, there are shown fixed point units 119 and floating point units 120 replicated four times to process one structure element each as can be found in the PowerPC™ VMX multimedia extension.

It can be seen that, where both scalar and SIMD instruction execution are provided, separately addressable register files are typically required for the various types of instructions that may be encountered by the CPU. For example, as shown in FIG. 1, a separate integer register file 114, floating point register file 116, and vector register file 118 are provided. Having separate registers files in this manner is expensive in terms of overhead as well as power consumption. Having multiple register files means that as code is executed, the code must switch or move between the various register files. This makes code generation expensive in terms of the overhead associated with moving between the various register files. Moreover, a compiler of the code may require more of one or another set of resources associated with the register files leading to register file fragmentation. Furthermore, having separate resources in the micro-architecture of the CPU increases the costs associated with fabrication of the CPU as well as costs associated with power consumption, heat dissipation, etc.

In U.S. Pat. No. 6,839,828, a combined scalar/vector addressable register file is described along with a processor designed to operate in a plurality of modes for processing vector and scalar instructions. A parallel vector unit, coupled to the register files, includes functional units configurable to operate in a vector operation mode and a scalar operation mode. The vector unit includes an apparatus for tightly coupling the functional units to perform an operation specified by a current instruction. Under a vector operation mode, the vector unit performs, in parallel, a single vector operation on a plurality of data elements. The operations performed on the plurality of data elements are each performed by a different functional unit of the vector unit. Under a scalar operation mode, the vector unit performs a scalar operation on a data element received from the register files in a functional unit within the vector unit.

While the mechanism of U.S. Pat. No. 6,839,828 provides the ability to store different types of instructions/data in the register file, in order to achieve this ability, the '828 patent sets forth a new architecture. The problem with defining a new architecture in this manner is that the new architecture precludes the successful compatible execution of legacy programs, i.e. pre-existing applications designed for execution by a previous architecture. Furthermore, the pre-existing legacy architectures supporting the legacy programs may contain assumptions and require specific data formats for scalar and vector data, making transparent sharing of scalar and vector data impossible in the prior art. Thus, the mechanisms of the '828 patent do not provide for multi-addressability, i.e. different ways of addressing registers in the register file based on the instruction type, e.g., legacy scalar, legacy vector, or a new instruction type.

The illustrative embodiments provide an apparatus and method for providing a multi-addressable register file and mechanisms for allowing a compiler to interlink scalar and extended vector code. Such a multi-addressable register file, and the interlinked code generated by such a compiler, may be implemented/executed in a processor of a data processing system. Such a data processing system may have one or more processors in which each processor, or a subset of processors, may implement the multi-addressable register file of the illustrative embodiments. The types of data processing systems in which processors having a multi-addressable register file in accordance with the illustrative embodiments may vary considerably and thus, the present description cannot address each such possible processor architecture. However, for purposes of illustration, FIG. 2 is provided as an example of one type of data processing system in which the multi-addressable register file of the illustrative embodiments may be implemented.

Figure 2:
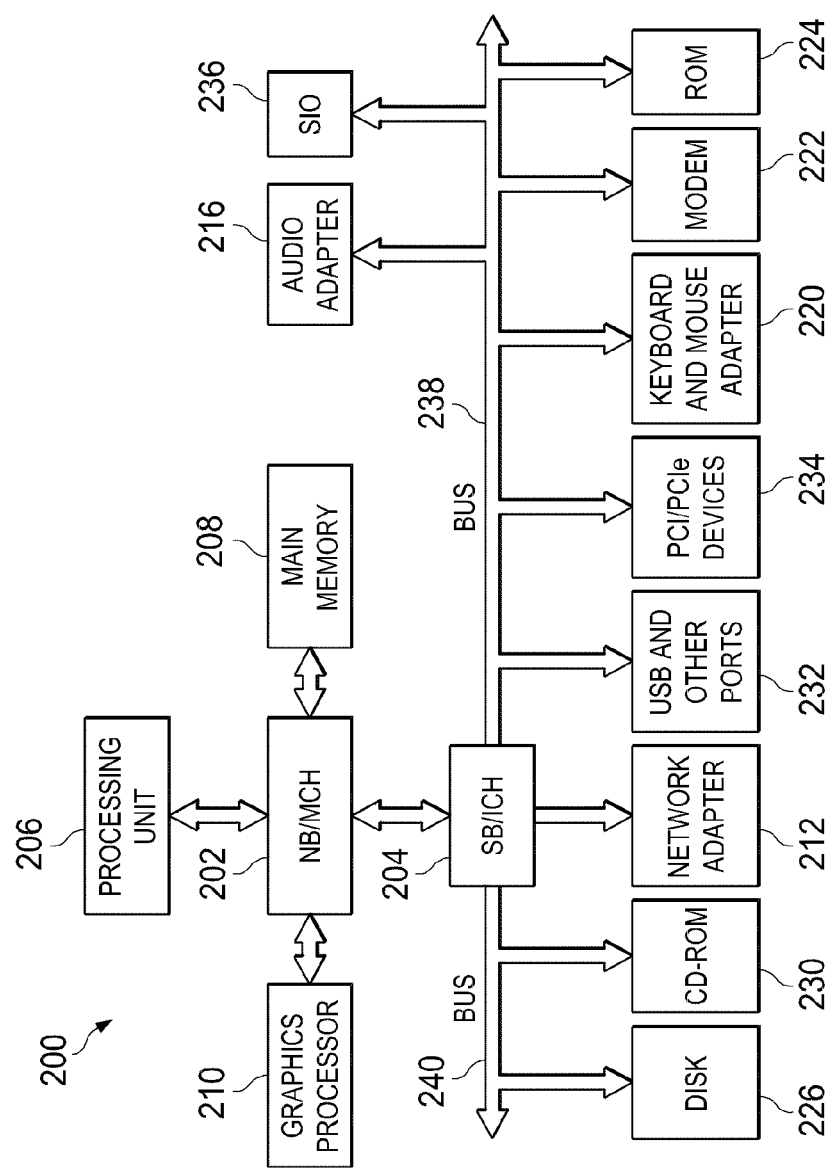
FIG. 2 is an exemplary diagram of a data processing system in which exemplary aspects of the illustrative embodiments may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both) or the Linux® operating system (LINUX is a trademark of Linus Torvalds in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ System p™ computer system, running the Advanced Interactive Executive (AIX®) operating system or the LINUX® operating system (eServer, System p™ and AIX are trademarks of International Business Machines Corporation in the United States, other countries, or both). Data processing system 200 may be a symmetric multiprocessor (SMP) system including a plurality of processors, such as the POWER™ processor available from International Business Machines Corporation of Armonk, N.Y., in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

Figure 3:
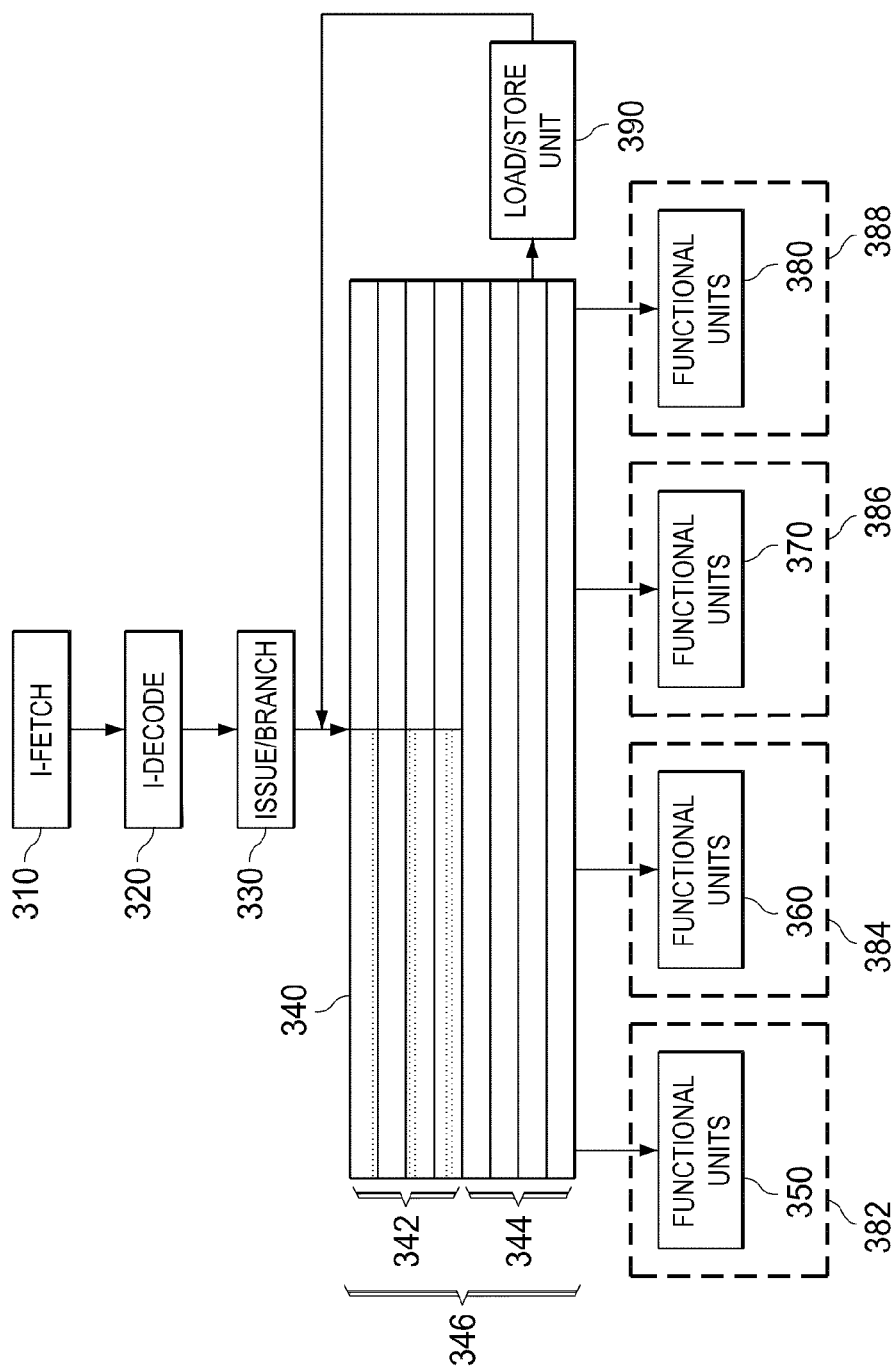
FIG. 3 is an exemplary diagram of a processor in which a multi-addressable register file is utilized in accordance with one illustrative embodiment.

FIG. 3 is an exemplary diagram of a processor in which a multi-addressable register file is utilized in accordance with one illustrative embodiment. With the processor architecture shown in FIG. 3, scalar and SIMD data path processing capabilities have been combined with the SIMD vector data path subsuming scalar processing. Scalar processing preferably occurs in one of the units used for processing one element of a vector data type. This data unit is designated the "preferred slot" and provides addresses for the branch unit and the load/ store unit, as will be described below. For simplicity, the depiction of the unified processor in FIG. 3 includes data flow connections only, and not control signal connections and external system interfaces, e.g., address lines, connections with memory, etc. The latter connections are assumed.

The unified processor of FIG. 3 includes an instruction fetch unit 310, which fetches instructions and data from the system's memory hierarchy (not shown) based upon the value of the fetch unit's program counter. Fetched instructions are provided by instruction fetch unit 310 to instruction decode unit 320, where they are decoded and expanded into appropriate control signals for controlling downstream units. The expanded instruction is passed to issue/branch unit 330, where it is placed into an instruction queue to await availability of appropriate functional units for processing. In the event that the instruction is a branch, control is returned to instruction fetch unit 310, which fetches the branch-target instruction, and the above process is repeated.

In the case of a scalar operation, when a functional unit (i.e., fixed point unit or floating point unit) becomes available or in the case of a vector operation, when multiple functional units become available, the issue/branch unit 304 issues the instruction to the one or more functional units. Before computation can be performed, source operand data is retrieved by accessing a scalar-vector register file (SVRF) 340. Multiple types of function units are typically provided, e.g., fixed point units, floating point units, and a load/store unit (LSU) 390, the latter fetching from and storing to the memory hierarchy the data identified by the current instruction. The LSU 390 stores the result of memory accesses back to the combined scalar-vector register file (SVRF) 340 via a bus. In this embodiment, the SVRF 340 stores vector data lines consisting of four vector elements or slots, each line being partitioned such that each of the four vector elements or slots is associated with different functional units 350-380.

Issue logic directs the SVRF 340 to pass the contents of a data line to the appropriate functional units 350-380 for processing. There may be any number and type of functional units associated with an issue slot, including, but not limited to, fixed-point unit, floating-point unit, comparison unit, logical operation unit, shift unit, etc. The particular functional unit within the set that will use the data word will depend on the instruction to be executed, and is controlled by a signal from issue/branch unit 330. Thus, if the instruction requires the fixed point units to operate on the data, data will be passed to fixed point units in one or more of the functional units 350-380. If other functional unit types are present, data would similarly be passed to them. When each designated functional unit has performed its operation on the input data, it passes a result back to the SVRF 340, where it is stored until requested by LSU 390, or passed to the functional units for further manipulation.

The operations to be performed by the functional units, and the functional units to perform those operations, are determined by control signals provided by issue/branch unit 330. When an operation directs the LSU 390 to read data from the SVRF 340, the data is passed via a data bus. In addition, the address to which the data is to be stored in memory is passed to LSU 390 via an address bus. In the embodiment of FIG. 3, the address bus passes information from a segment (D) of SVRF 340, which is associated with one or more functional units 350-380. The preferred slot could be any of the functional units, by either defining them as preferred slot, or by means of dynamically determining a preferred slot, either by setting a control register, specifying a slot in the instruction word, or by determining it using any other means, e.g., by the issue unit at issue time. The designation of a preferred slot allows for selective powering-down of functional units, resulting in power savings.

To this point, the described operation of the unified processor has applied to both scalar and vector operations. That is, if an operation to be performed is a scalar operation, thus requiring operation and output of only one functional unit pair, the remaining functional unit pairs may nevertheless be directed to perform the same operation on data passed to them from the scalar vector register file. Such an approach allows for simplicity of design, since to require different functional units to simultaneously execute different operations necessarily introduces complicating design considerations. Likewise, for a vector operation, each functional unit pair will perform the same operation (or substantially the same operation as part of a tightly coupled operation, or a combination of tightly coupled operations as specified by a single instruction) on incoming data.

Scalar and vector operations are distinguished by the manner in which associated address information is used, in accordance with the interpretation of the operation. The operation's interpretation may be a direct result of its operation code, that is, different operation codes may be available for different instructions (e.g., "load scalar byte," "load scalar word," "load vector") or may depend on another part of the system, e.g., mode tag bits to interpret a single "load" opcode. Even scalar data spans an address range of bytes (although fewer bytes than a vector) and there are also variations on how load/store may operate.

The LSU 390 operates on the entire line of data, or a subset thereof, contained within SVRF 340. The LSU 390 operates in either load or store operation mode, depending on the instruction issued by the issue/branch unit 330. In load mode, LSU 390 receives address information from the preferred slot of the SVRF 340 using the address bus, and loads data from the specified address. When a load vector instruction is being executed, the load operation loads an entire line of data from memory to SVRF 340. When a load scalar operation is specified, the load operation will load at least the number of bits corresponding to the size of the scalar type (typically, byte, half-word, word, and so forth). Additional bits may be loaded in accordance with implementation choices, or invalid data, or data initialized to a default value (such as, but not limited to, "0") may be provided for those bits outside the range of the requested data type. In one embodiment, the "load scalar" operation includes an alignment step, wherein a requested scalar value is aligned in the preferred slot before being stored to SVRF 240. In another embodiment, alignment is performed programmatically using a sequence of one or more instructions.

In the store mode of operation, the LSU 390 receives data to be stored from the SVRF 340 by means of the data bus, and address information from the preferred slot of the SVRF 340 using an address bus, and stores data to the specified address.

The instruction decode unit 320 has logic that is used to decode instructions of three different types: vector, scalar, and an extended vector instruction type. In one illustrative embodiment, these three different types of instructions are vector multimedia extension (VMX) instructions, floating point (FP) instructions, and new Vector-Scalar Extension (VSX) instructions. FP operations are generally known in the art. VMX instructions are used in the POWER6 processor, available from International Business Machines Corporation of Armonk, N.Y. and provide single instructions that operate on multiple data elements.

Based on the decoded instructions, the instruction will access either a sub-range of the register file 340 or the entire range of registers in the register file 340. If the instruction is determined by the instruction decode unit 320 to be a legacy floating point instruction, then a first sub-range 342 of the register file 340 is accessed, with the data being provided to appropriate functional units 350-380 for processing. If the instruction is determined by the instruction decode unit 320 to be a legacy VMX vector instruction, then a second sub-range 344 of the register file 340 is accessed, with the data again being provided to appropriate functional units 350-380 for processing. If the instruction is determined by the instruction decode unit 320 to be a VSX instruction, then a the entire range 346 of the register file 340 may be accessed, with the data being provided to appropriate functional units 350-380 for processing. Depending on the particular VSX instruction being executed, a VSX instruction accessing any of registers 346 can use either the entire width of the register to obtain input data (corresponding to a new VSX vector instruction and providing access to all registers of register file 346 in each of the operand positions of the instruction), or a portion thereof (corresponding to a new VSX scalar instruction and providing access to all registers of register file 346 in each of the operand positions of the instruction, but using only a subset of bits contained therein)

The first sub-range 342 comprises a first range of bits of a first set of registers in the register file 340. The second sub-range 340 comprises a second range of bits of a second set of registers in the register file. The third range 346 comprises an entire range of bits of the entire set of registers in the register file 340. In this way, a single register file 4340 may be used to process both legacy scalar and legacy vector instructions as well as a new combined set of vector-scalar instructions, referred to herein as VSX instructions.

VSX instructions are new instructions that can access the entire set of registers of a register file 340. The VSX instruction set consists of several classes of instructions, including single precision scalar floating point instructions accessing a 32-bit subrange of each register of the entire register file 340, double precision scalar floating point instructions accessing a 64-bit subrange of each register of the entire register file 340, and new vector instructions accessing the entire range of bits in the entire register file 340. The VSX instructions use a new type of register specifier, e.g., a 6 bit register specifier as opposed to a legacy 5 bit specifier that is used by legacy scalar and legacy vector instructions.

Thus, the illustrative embodiments provide a single scalar/vector architecture for a register file that is compatible with legacy architectures having separate scalar and vector register files. The illustrative embodiments further allow sharing of the storage space of the processor between legacy register files and a new expanded vector-scalar register file without leading to increased chip area. Moreover, the illustrative embodiments allow data sharing between legacy programs and libraries using legacy instructions, and new programs and libraries (using either legacy or new instructions), as well as interoperation of code, thereby protecting investment in code tuning of legacy applications and avoiding the need to recode all applications to use the new instructions while allowing the new instructions to be used where they are most profitable. As a result, the expensive overhead experienced by known processor architectures that utilize separate register files for scalar and vector, e.g., single instruction multiple data (SIMD), instructions, as well as the additional costs involved with complex new architectures for handling both scalar and vector instructions using a single register file, may be avoided.

The register file 340 is comprised of a plurality of vector-scalar registers (VSRs), each VSR having a plurality of bits. For example, the register file 340 may be comprised of 64 VSRs numbered VSR[0] to VSR[63] with each VSR having 128 bits numbered 0 to 127. For representation purposes, it will be assumed that VSRs are numbered consecutively from the top to the bottom of the register file 340 with bits being numbered consecutively from left to right of the register file 340. This is shown in FIG. 4 discussed hereafter.

In an alternative embodiment, the present invention is used in conjunction with a QPX (quad-processing extension) instruction set, wherein 32 floating point registers have been extended to 256 bits each, and the new QPR registers can be addressed by either legacy scalar instructions or new quad-vector instructions.

Those skilled in the art will understand that in a processor design, some execution resources may have been combined in the manner outlined herein, such as for example vector and floating point execution resources, while one or more classes of execution resources may retain distinct execution resources and register files, e.g., such as scalar integer and address processing, or condition register operations.

Figure 4:
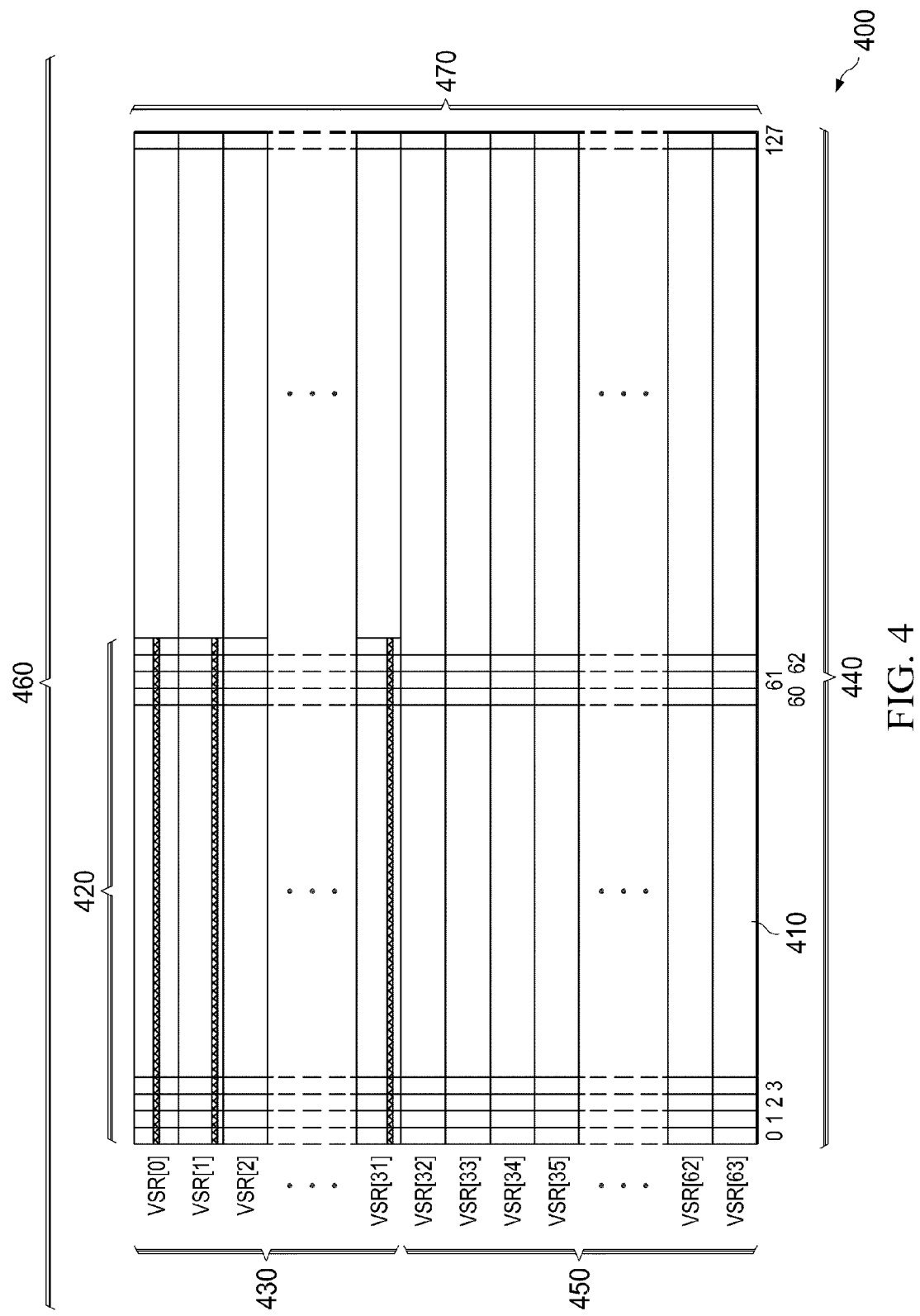
FIG. 4 is an example diagram of a multi-addressable register file in accordance with one illustrative embodiment.

FIG. 4 is an example diagram of a multi-addressable register file in accordance with one illustrative embodiment. The multi-addressable register file shown in FIG. 4 is an example of the multi-addressable register file described in co-pending and commonly assigned U.S. patent application Ser. No. 12/023,720 entitled "Multi-Addressable Register File" and filed on Jan. 31, 2008, which is hereby incorporated by reference. The register file 400 of FIG. 4 may be utilized as a register file in the processor architecture shown in FIG. 3 above, for example.

As shown in FIG. 4, the register file 400 includes a plurality of vector-scalar registers (VSRs) 410 numbered VSR[0] to VSR[63]. Each of the VSRs 410 has a predetermined number of bits that may be set. In the depicted example, each VSR 410 has 128 bits numbered 0 to 127 for storing data corresponding to instructions, such as for parameter passing.

A first sub-range of bits 420 in a first set of registers 430 of the register file 400 is associated with a first type of instruction, such as a scalar or floating point instruction. A second sub-range of bits 440 in a second set of registers 450 in the register file 400 is associated with a second type of instruction, such as a vector, SIMD, or VMX instruction. A third range of bits 460 in the entire set of registers 470 of the register file 400 is associated with a third type of instruction, such as a VSX instruction.

It can be appreciated from FIG. 4 that the register file 400 differs from known register files in known systems by allowing three different types of instructions to access registers of the register file 400 based on associated register ranges and bit widths within the registers. Known register files, upon which the mechanisms of the illustrative embodiments improve, require that the entire register file be accessed in the same manner for all types of instructions by specifying the register to be accessed with respect to the entire set of registers 470 rather than with respect to a subset of registers that corresponds to all operands of a specific instruction type.

With the register file 400, when a legacy scalar operation is to read/write data from/to the register file 400, in one illustrative embodiment, the scalar data value is read/written from/to the left side of the register width, i.e. bits 0 to 63 of registers VSR[0] to VSR[31], for example first sub-range 420. There are a number of ways by which scalar values may be written to the vector-scalar registers (VSRs) using the mechanisms of the illustrative embodiments. In one illustrative embodiment, all of the bits of the VSR may be written with the scalar value being written to bits 0 to 63 while values corresponding to the result of a vector computation being performed for the bits not corresponding to the scalar data value, on the registers specified by the scalar instruction, are written to the bits 64 to 127. For example, if the data values of registers F0 and F1 are added to give a result in register F3, the value of VSR3 in bits 64 to 127 might correspond to a values as if a vector operation had been performed on the bits 64 to 127 of VSR0 and VSR1.

In another illustrative embodiment, the scalar value that is to be written to bits 0 to 63 may be replicated in bits 64 to 127. This approach may be beneficial, for example, when a scalar floating point value should later be combined with a vector value, e.g., when multiplying a vector by a scalar value. Normally the scalar value has to first be replicated across an entire register, such as with a "splat" instruction of the VMX or VSX instruction sets. This approach would eliminate the need for performing a "splat" instruction since the scalar value is already replicated.

In still another illustrative embodiment, the scalar value may be written to bits 0 to 63 of the register while whatever values that were present in bits 64 to 127 may remain unchanged. Such an approach may be used when a vector operation may need to be decomposed into a sequence of scalar operations, where each scalar result could be inserted into a specific vector element, ultimately creating a vector result from the multiple scalar results. This would be the lowest power embodiment since, when nothing needs to be written to the registers, nothing is written. However, it may lead to indeterminism, because the value present in the entire register may now be dependent on what value was resident in the register file prior to a scalar result being written. This is particularly problematic for architectures with register renaming, where the value present in the rename register is highly unpredictable.

In another illustrative embodiment, the scalar value may be written to bits 0 to 63 of the register while the remaining bits 64 to 127 may be filled with a default value or padding value, e.g., a zero. Such an approach may be used when a vector operation may need to be decomposed into a sequence of scalar operations, where the multiple scalar results are shifting and ORed together to form a vector result. This approach gives a predictable value, thus avoiding the problems associated with not writing anything. This option further represents lower load on the result bus than replicating the value (because that value does not have to be provided to 2 locations in the register which double the load).

For legacy vector, SIMD, or VMX instructions, the data values are read from/written to the entire range of bits 0 to 127 of the second set of VSRs [32] to [63]. For the extended vector instructions, data values are read from/written to the entire range of bits 0 to 127 of the entire set of VSRs [0] to [63]. With these extended vector instructions, scalar values are written in the left side bits 0 to 63 of the registers while vector values are written across all of the bits 0 to 127.

As noted above, typically, processors either utilize a scalar architecture or a vector architecture. However, some architectures are able to perform both scalar and vector computations. Typically, in such architectures, the hardware is separated into scalar hardware and vector hardware, e.g., the computing device may have a scalar processor and a vector processor. Scalar code is executed using the scalar hardware while vectorized code is executed by the vector processor. No intermixing of scalar and vector code is permitted in such combined architectures.

In such an architecture, the execution resources for scalar and vector execution are usually distinct, with separate register files corresponding to scalar and vector register files. Linkage conventions are separately established for each of these register files, and data transfers between scalar and register files have to be performed using a sequence of one or more instructions, often by storing data to memory from a first register file and reloading data from memory to a second register file.

In accordance with a preferred evolution of architectures, new vector resources are added by either extending scalar registers to also store vector registers (e.g., corresponding to the extension of the Power Architecture FPR floating point registers into QPR quad-processing vector registers), for more narrow vector registers to store wider vectors, and/or for separate register files, e.g., such as distinct scalar and vector register files, to be combined into a single register file, such as a vector-scalar register file.

When an architecture improvement as described above occurs, the system designers are faced with the competing challenges of maintaining compatibility for old applications having been developed and tested in the pre-enhancement specification of the architecture, and making the full range of enhanced capabilities available for new applications to fully exploit the enhancements to the architecture.

One solution to answering these competing challenges is to provide two software operating environments for the new hardware architecture, corresponding to a legacy software environment and a new enhanced environment. These environments may be offered at different levels, e.g., as libraries and build processes for a common process abstraction within an operating system, as separate process types within an operating system, or as different operating systems executing in different partitions under a common hypervisor.

In such an architecture, the hardware of the processor is operated in two distinct ways depending upon whether the hardware is executing legacy code or new code. That is, the hardware will run legacy code using a compatibility environment, or "old" environment, and the hardware will run new code in an environment adapted to provide access to all enhanced features, or "new" environment. While the hardware is able to run both types of code, the hardware does not support intermixing of legacy and enhanced code, i.e. old and new code. That is, old code cannot call new code and new code cannot call old code and each type of code utilizes a different data representation. Thus, vendors must ship two libraries to support two environments—a legacy environment and an enhanced feature set environment. Moreover, system software must maintain separate executable type identifiers and prevent interlinkage of the two different types of executable code.

However, the illustrative embodiments set forth herein provide mechanisms for interlinking legacy (old) and enhanced (new) code wherein enhanced code can make use of extended width registers present in the enhanced architecture specification, and at a narrower width in a legacy environment, such that executable code may be generated that comprises a combination of legacy and enhanced feature code with legacy code (wherein some registers are only available as narrow width registers, e.g., such as scalar registers) being able to call enhanced-feature code (wherein some registers available as narrow width registers in the legacy specification have been extended to a wider specification) and vice versa. In accordance with one aspect of the illustrative embodiments, such interlinkage is supported for linkage conventions supporting the passing of input and output parameters in registers. In accordance with another aspect of the illustrative embodiments, register use conventions of a legacy environment are adapted to allow compatibly linking unmodified legacy object modules with new enhanced feature set code. In yet another aspect of the illustrative embodiments, there are provided improved code generation methods for the generation of new enhanced code for improved efficiency with linkage convention which has been specified to support inter-linkage between legacy and new enhanced feature set code.

These mechanisms utilize a processor architecture such as that shown above with regard to FIGS. 1-4 and further provide compiler implemented mechanisms for interlinking legacy code (with narrow register widths) and enhanced feature code (utilizing the full extended register widths) in such a way that one type of code may call the other type of code utilizing a calling convention and data representation that supports such interlinking. That is, the mechanisms of the illustrative embodiments permit a linker to mix scalar and vector code while ensuring that the resulting interlinked code executes properly. To achieve such a result, the mechanisms of the illustrative embodiments provide (1) an ability to execute scalar (or reduced register width) code in an unmodified manner; (2) a compatible data representation at interfaces between scalar (or reduced register width) and vector (or extended register width) code; and (3) a compatible calling convention that supports scalar (or reduced register width) code calling vector (or extended register width) code and vector (or extended register width) code calling scalar (or reduced register width) code.

While the discussion contained herein will use an exemplary embodiment referring to scalar code and vector code, those skilled in the art will understand hat for the purposes of the exposition of the invention, "scalar code" shall refer to any code generated with respect to an ABI not cognizant of a register set having been extended in width in an extended architecture specification. In one embodiment, the registers that may have been extended may include narrow vector registers. There may also be present other vector code in other function units, such as a VMX unit present in the legacy specification. "Vector code" shall refer to code having been generated in accordance with an ABI cognizant of the extended width of the extended register set. Vector code may also include scalar computations, being performed using the extended register set, wherein the compiler and code generation methods are cognizant of the extended register set, and scalar computations using any additional register sets that have not been extended.

With the interlinking mechanisms of the illustrative embodiment, when vector code is called by scalar code, the vector code provides a compatible register save/restore operation, parameters are aligned in the registers at compatible locations expected by the scalar code, and results are returned in compatible locations expected by the scalar code. The vector code is configured to cope with the alignment of data provided by the scalar code, e.g., data alignment, stack alignment, etc.

The scalar code that is called by the vector code, on the other hand, is unmodified. That is, the scalar code conforms to the pre-existing calling interfaces of scalar architecture and stores registers, or portions of registers, corresponding to the Application Binary Interface (ABI) in effect when the scalar code was generated. As is generally known in the art, and described, for example, in Hoxey et al., *The PowerPC Compiler Writer's Guide*, International Business Machines Corporation, 1996, an Application Binary Interface (ABI) includes a set of conventions that allows a linker to combine separately compiled and assembled elements of a program so that they can be treated as a unit. The ABI defines the binary interfaces between compiled units and the overall layout of application components comprising a single task within an operating system. The requirements and constraints of the ABI relevant to the compiler extend only to the interfaces between shared system elements. As a practical matter, ABIs tend to be associated with a particular operating system or family of operating systems. Programs compiled for one ABI are frequently incompatible with programs compiled for another ABI because of the low-level strategic decisions required by an ABI.

Compiled code exposes interfaces to procedures and global data. The program model for the PowerPC ABI consists of a code segment, a global data segment, and a stack segment for every active thread. A thread is a binding of an executing program, its code segment, and a stack segment that contains the state information corresponding to the execution of the thread. Global variables are shared.

The procedure (or subroutine) is the fundamental element of execution and, with the exception of references to globally defined data and external procedures, represents a closed unit. Many compilers make the procedure the fundamental unit of compilation and do not attempt any inter-procedural optimization. An ABI specifies conventions for the inter-procedure interfaces.

The interface between two procedures is defined in terms of the "caller" and the "callee." The caller computes parameters to the procedure, binds them to arguments, and then transfers control to the callee. The callee uses the arguments, computes a value (possibly null), and then returns control to the statement following the call. The details of this interface constitute much of the content of the ABI.

When a procedure is called, some prolog code may be executed to create a block of storage for the procedure on the run-time stack, called an "activation record," before the procedure body is executed. When the procedure returns, some epilog code may be executed to clean up the state of the run-time stack.

At the procedure call interface, the ABI defines the use of registers. Registers are classified as dedicated, volatile, or non-volatile. Dedicated registers have assigned uses and generally should not be modified by the compiler. Volatile registers are available for use at all times. Volatile registers are frequently called "caller-save registers." Non-volatile registers are available for use, but they must be saved before being used in the local context and restored prior to return. These registers are frequently called "callee-save registers.

FIG. 5 is an example diagram of a known ABI, utilized in scalar processor architectures, which illustrates the conventions for management of specific registers at the procedure call interface. As shown in FIG. 5, the ABI comprises a 64 bit register that stores a first floating point (FP) value that stores a volatile return value (FP0), a second set of FP registers FP1-FP13 that store volatile parameters, and a third set of FP bits FP14-FP31 whose values are preserved across procedure calls. The ABI illustrated in FIG. 5 may be utilized by legacy scalar code, i.e. the legacy scalar code expects to utilize this ABI when storing and receiving data, such as parameters, arguments, and the like. (The exemplary ABI is based on the AIX ABI used for the Power Architecture, but has been simplified and modified for ease of exposition.)

In accordance with this ABI definition, a calling function passes floating point parameters in registers FP1 to FP13. These registers are not preserved by the called function, and if the calling function requires the values after function invocation, they must be saved and restored by the calling function. Register FP0 contains a floating point return value, if one is to be provided by a called function, and hence is similarly not preserved across function calls. Thus, if the calling function requires the values after function invocation, it must be saved and restored by the calling function. Registers FP14 to FP31 are preserved across function calls, i.e., a calling function can expect the value to have the same contents as at function invocation time. If a called function uses these registers, it must store and preserve them, usually in code section referred to as prolog (for storing the registers) and epilog (for restoring the register values).

FIG. 6 is an example diagram of an extended ABI that extends floating point registers to floating point vector registers having 256 bits and storing up to 4 floating point values. Thus, the ABI shown in FIG. 6 utilizes a wider register configuration, i.e. a 256 bit register, than the narrower register of the ABI shown in FIG. 5, i.e. the 64 bit register.

As shown in FIG. 6, the extended floating point (FP) ABI uses four 64 bit vector slots 610-640. The first 64-bit vector slot 610 corresponds to the ABI illustrated in FIG. 4. The first 14 registers FP0-FP13 are callee-saved registers, i.e., the code using the registers around the call site (the caller) is responsible for storing registers. Consequently, code which uses is cognizant of vector registers and uses these registers to hold vectors can use vector load and store instructions to preserve the register values across function invocations. Legacy code, which is only cognizant of the scalar portions of these registers (i.e., corresponding to the first vector element position of each of registers F0 to F13, also known as "preferred slot") only uses, and preserves, the scalar portion of the register.

However, the last registers FP14-FP31 are preserved, i.e. stored by the callee ("callee-saved"). For these registers, the second through fourth vector slots 620-640 are not recognized by scalar or legacy code but instead are used by extended vector code in accordance with an extended vector code ABI. Since the scalar or legacy code does not know about the bits FP14-FP31 in the second through fourth vector slots 620-640, the scalar or legacy code cannot save these bits. Yet, based on definitions of the architecture, scalar code may modify the entire register as a side effect of a scalar operation, e.g., as defined by the known QPX and VSX instruction set extensions. Moreover, there is no room reserved in the scalar or legacy code stack frames for storing such bits.

Figure 7:
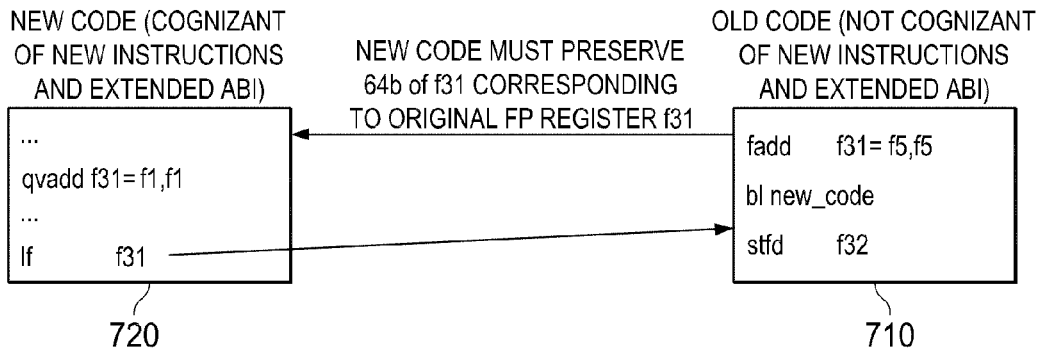
FIG. 7 illustrates an example of the problem with interlinking scalar or legacy code with extended vector code where the scalar code attempts to call extended vector code.

FIG. 7 illustrates an example of the problem with interlinking scalar or legacy code with extended vector code where the scalar code attempts to call extended vector code. As shown in FIG. 7, legacy code 710 includes a branch and link (bl) to extended vector code, or "new_code", 720. In this scenario, the legacy code 710 does not know whether it is calling "old," or legacy, code or whether it is calling "new," or extended vector, code. Moreover, the new code 720 does not know whether it is being called by old code or new code. The new code 720 is aware of the extended vector ABI in FIG. 6, however the old code 710 is not aware of the extended ABI. Thus, the old code 710 is expecting to provide data and receive resultant data using the scalar ABI in FIG. 5. However, the new code 720 utilizes the extended vector ABI in FIG. 6 and expects that the bit values stored in the vector slots are preserved by the code that it is interacting with. That is, the new code 720 must preserve the 64 bits of the register f31 corresponding to the original floating point register f31.

Figure 8:
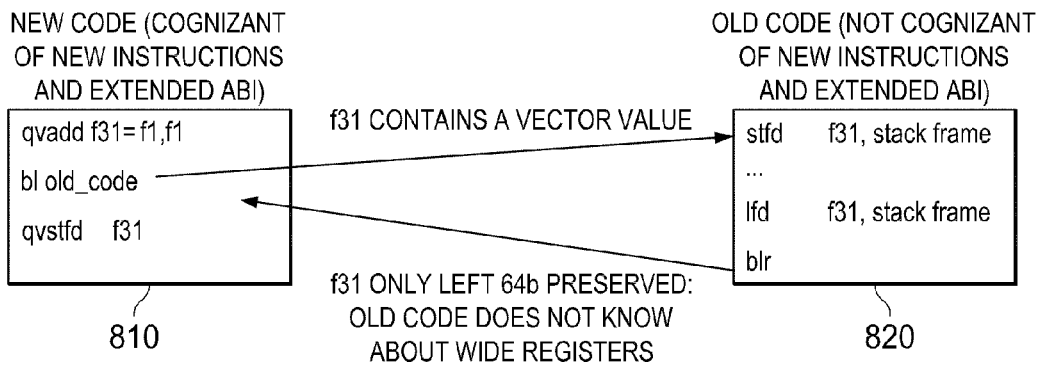
FIG. 8 illustrates an example of the problem with interlinking scalar or legacy code with extended vector code where the extended vector code attempts to call scalar code.

FIG. 8 illustrates an example of the problem with interlinking scalar or legacy code with extended vector code where the extended vector code attempts to call scalar code. As shown in FIG. 8, extended vector code, or "new" code, 810 includes a branch and link (bl) to scalar code, or "old_code", 820. The call to the old code is preceded by the add operation in which the vector register f1 is added to itself and the result is stored in vector register f31. When the old_code 820 is called, the old_code 820 does not preserve the vector slot values that it is not aware of. To the contrary, only the left 64 bits of the vector register f31 (corresponding to the preferred slot, i.e., the original floating point register set) are preserved by the old_code 820 since the old_code 820 is not aware of the wider register configuration.

The illustrative embodiments provide mechanisms to account for this problem of the old code, i.e. scalar or legacy code, not being cognizant of the wider register ABI utilized by the new code, i.e. the extended vector code. The mechanisms of the illustrative embodiments provide a calling mechanism in which a portion of a vector register that corresponds to the old code ABI, i.e. the narrower register ABI, which is callee-saved is also callee-saved using the mechanism of the illustrative embodiments. However, a portion of the vector register corresponding to the extended ABI, i.e. the extension of the narrower register ABI to the wider register ABI, that was callee-saved is now caller-saved. In other words, in a processor architecture that utilizes a vector register file in which there are a plurality of vector slots per vector register, e.g., 4 vector slots per vector register as shown in FIG. 5, the scalar code saves the data in the left-most slot of the vector register, i.e. the first slot of the vector register. This holds whether the scalar code is the caller or the callee.

If the scalar code is the callee, i.e. it is called by extended vector code, even though the extended vector code uses the wider vector register, the scalar code, when called, only preserves the data in the first one or more slots of the vector register corresponding to bit positions having been saved in accordance with the legacy ABI. If the scalar code is the caller, the scalar code naturally, by virtue of the ABI utilized by the scalar code, operates on only the first slot of the wider vector register. The other slots of the vector register may be populated with padding values. In one illustrative embodiment, a load-and-splat operation may be performed to populate the other slots. That is, the value stored in the first slot by the scalar code is replicated by the splat operation into the other second through fourth slots. A compiler may insert prolog and epilog code at portions of original code where a call is performed so as to implement this storage and preserving of values by the callee in accordance with the callee's ABI, and compatibility with the ABI of the caller.

The second through fourth slots (or in other embodiments, the remaining positions not saved by the callee in accordance with the legacy ABI) are preserved by the caller. That is, if the caller is extended vector code, then the caller is configured not to expect these remaining slots to be preserved by a callee. Furthermore, when passing parameters, to pass scalar data to scalar (or extended vector) code using only the first slot of the wider vector register.

To preserve values in vector slots not preserved by the caller in accordance with the extended ABI of the illustrative embodiments, generated code can store these slots (or the entire vector register) in memory, e.g., in a static save area or a stack frame. These caller saved values may be used to restore data upon control being passed back to the extended vector code by the called scalar code. When a wide register is partially preserved and partially volatile, a caller may decide to either spill and restore only a portion of the wide register combined with merging the values to be restored with callee-preserved data, or preserve the entire register overriding and ignoring callee-saving behavior of a portion of the vector. The latter choice may be advantage if storing and merging partial values is more expensive that saving entire registers with respect to a cost metric such as runtime. If the extended vector code is the callee, the extended vector code will only receive valid data in the first slot of the vector register being passed to it by the scalar code and thus, may ignore any padding values stored in the other slots. However, the extended vector code must also only pass back result data to the caller using the first slot of the vector register as the scalar code is not cognizant of the other slots of the extended wider register. Again, prolog and epilog code associated with calls may be used to enforce such preserving of data values.

Thus, with the mechanisms of the illustrative embodiments, scalar values are preferably allocated first to the first slot of the vector register. Scalar values in the first slot of the vector register are preserved and there is no need to store the extended register portion, i.e. the second through fourth slots may be populated with "don't care" values, copies of the scalar value such as through a load-and-splat operation, or the like. When allocating wide data to wide vector registers which were previously callee-saved, at a minimum the right hand side of the vector register, e.g., the second through fourth vector elements in a vector register according to one exemplary embodiment, are caller saved. These register values must be stored and recovered by the caller, either by storing at least the portion of the vector that is caller-saved and later merged upon a restore operation, i.e. when the callee restores control to the caller, or the entire register may be treated as caller-save by the caller. However, in accordance with the illustrative embodiments, even when a decision is made to treat such partial registers as caller-save for the purpose of allocating vector registers, code must still preserve at least the bits corresponding to the original callee-saved register portion in the callee to ensure correct interoperation. Prolog/epilog code is inserted in the extended vector code so as to achieve this functionality while the scalar code, or legacy code, is executed in an unmodified manner.

In one aspect of the illustrative embodiments, a compiler is adapted to generate code in accordance with the described extended ABI to generate the code corresponding to caller-save and callee-save values. The code complies with data value use, and preserved and volatile definitions of the register conventions, corresponding with the extended ABI in accordance with the illustrative embodiments. In another aspect of the illustrative embodiments, the compiler register allocation sequence is modified to preferably allocate scalar variables to registers corresponding to a register with a split calling convention wherein the scalar portion is callee-saved. In accordance with this compiler code generation mechanisms, the extended volatile portion of a vector register does not need to be saved in the caller when only the scalar data needs to be preserved across a function call.

The illustrative embodiments may utilize this calling convention in conjunction with a multi-addressable register file, i.e. a combined vector scalar register file that stores both scalar values and vector values in vector registers, such as that described above with regard to FIG. 3. With the illustrative embodiments, using the multi-addressable register file of FIG. 3, compiling mechanisms are provided that ensure that parameters and results are stored in registers corresponding to a legacy ABI of legacy code, such as the scalar legacy ABI described above with regard to FIG. 5.

Figure 9:
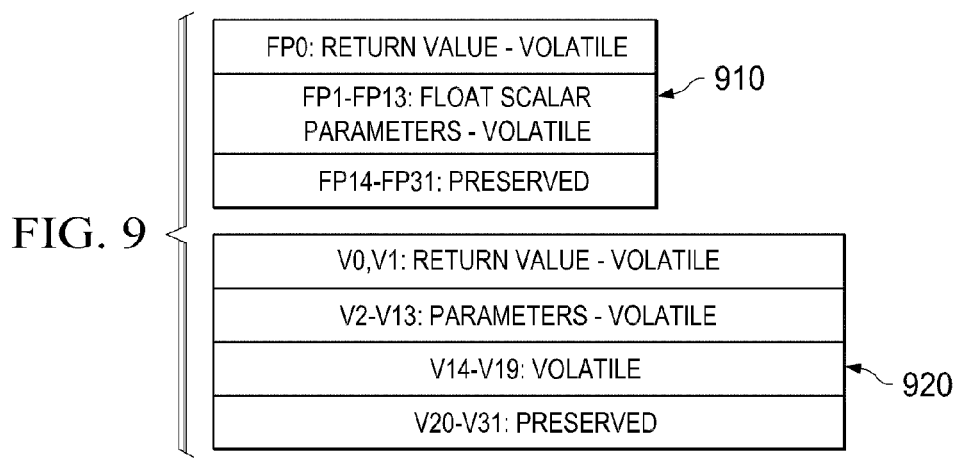
FIG. 9 is an example diagram illustrating a linkage convention of a legacy ABI comprising two register files, one adapted for floating point scalar processing and one adapted to vector media processing using vector values.

Referring now to FIG. 9, there is shown the linkage convention of a legacy ABI comprising two register files, one adapted for floating point scalar processing 910 and one adapted to vector media processing using vector values 920. The exemplary ABI is based on a common PowerPC ABI, but has been modified for simplification. In accordance with the linkage convention of the legacy ABI as shown in FIG. 9, scalar function input and output parameters are passed to a function in floating point scalar registers 910 and vector input and output parameters are passed to a function in vector registers 920.

Figure 10:
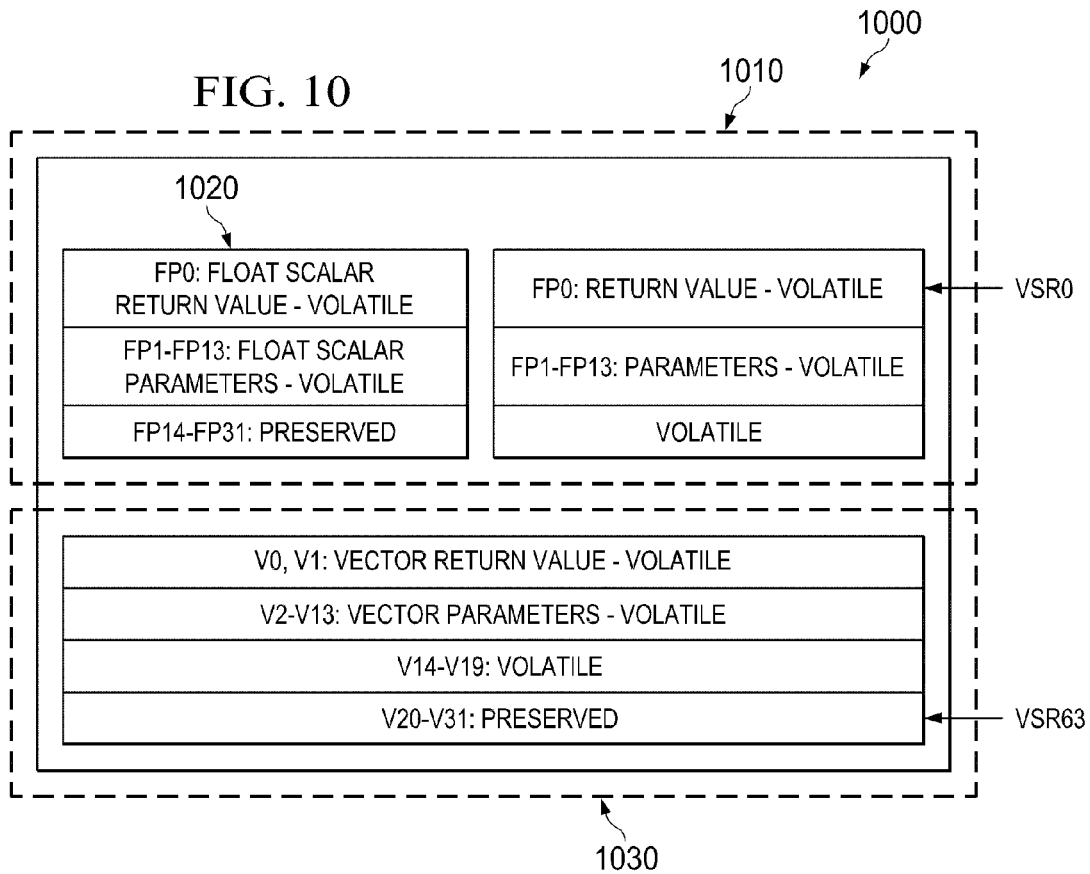
FIG. 10 is an example diagram illustrating an exemplary linkage convention for an extended ABI definition adapted to support a multi-addressable register file in accordance with the illustrative embodiments.

FIG. 10 shows an exemplary linkage convention for an extended ABI definition adapted to support a multi-addressable register file in accordance with the illustrative embodiments. The multi-addressable register file 1000 subsumes distinct legacy register files for scalar and vector register files.

In accordance with the illustrative embodiments, the extended ABI uses distinct registers of the new multi-addressable register file 1000 corresponding to the legacy register files to pass the respective types of arguments in a manner consistent with the legacy conventions. Thus, in accordance with this extended ABI, parameters passed in legacy systems using floating point scalar registers FP0 to FP13 will be passed in the corresponding registers VSR0 to VSR13 of the portion 1010 of the multi-addressable register file 1000, only using the scalar register portion 1020 of these registers VSR0 to VSR13. In addition, vector parameters that are passed in vector registers V0 to V13 are passed in the extended ABI in the corresponding VSX registers VSR32 o VSR45 in portion 1030 of the multi-addressable register file 1000.

In accordance with the illustrative embodiments, the inter-linkage of legacy ABI code with the extended ABI code is cognizant of two distinctive register files of the legacy architecture, and corresponding to register subsets 1010 and 1030 of the new extended multi-addressable register file 1000, with code taking advantage of the new extended multi-addressable register file 1000 and using the extended ABI without the need to recompile scalar legacy code, allowing reuse of libraries and object files previously generated, in the building of new binaries exploiting new capabilities for increased performance. In accordance with the illustrative embodiments, some registers are also extended and used in the manner described in conjunction with FIGS. 5-8 discussed previously.

In one aspect of the illustrative embodiments, a compiler is enabled to generate code in accordance with the extended ABI definition of the illustrative embodiments. In another aspect of the illustrative embodiments, when the compiler generates the code in accordance with an extended instruction set in accordance with the extended ABI, e.g., extended vector code using the ABI described above with regard to FIG. 10, all registers in the multi-addressable register file are made available for register allocation for all classes of supported data types, thereby improving code quality and value reuse.

In accordance with another aspect of the illustrative embodiments, some instructions are only available in the legacy ISA set and not supported in the full set of registers in the new multi-addressable register file. In such a case, the compiler may transform and compile the code such that when a legacy instruction is used, its inputs and outputs are constrained to the legacy register range of its respective register file.

Using the register file configuration described above with regard to FIGS. 3 and 4, 9 and 10, and the calling convention and data representation of the illustrative embodiments, a linker according to the illustrative embodiments interlinks new code and legacy code by mixing the new and legacy code and transforming calls between new and legacy code. In accordance with one aspect of the illustrative embodiments, this interlinking occurs without the insertion of auxiliary code to provide inter-linkage support, or rewriting of either legacy or new extended code. In accordance with the illustrative embodiments, this is facilitated by the definition of the extended ABI in a manner to allow efficient interlinking without the need to modify generated code. The compiler generates code for extended capability code in accordance with the ABI which has been defined to allow such interlinking without requiring auxiliary code, such as trampoline or glue code that is inserted between two functions, generated to facilitate interlinking of legacy and new extended code.

In general, the compiler does not modify the legacy code which is left to execute in an unmodified manner. However, the new code has been generated to accommodate the more limited ABI utilized by the legacy code.

Referring now to another aspect of the ABI definition of the illustrative embodiments, common ABIs define a minimum stack alignment. New instruction set extensions may have more strict alignment requirements, e.g., corresponding to the efficient provision of wider registers. Thus, during some execution scenarios, new code compiled may find that the stack is not sufficiently strictly aligned when called from legacy code.

Figure 11:
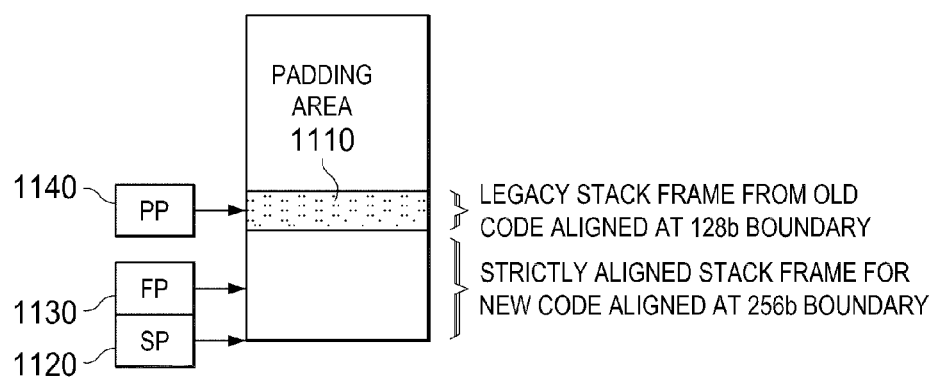
FIG. 11 illustrates an example operation for growing a local stack frame for accommodating more strictly aligned ABIs in accordance with one illustrative embodiment.

In accordance with an improved code generation technique of the illustrative embodiments, code is generated to grow a local stack frame, a variable number of bytes to ensure alignment of local data accesses relative to a more strictly aligned ABI. The number of bytes is determined dynamically to enforce alignment of the stack pointer for a new ABI function at a new more strict alignment. FIG. 11 illustrates an example operation for growing a local stack frame for accommodating more strictly aligned ABIs in accordance with one illustrative embodiment.

As shown in FIG. 11, when a call is made from legacy code with a less strict alignment (e.g., 128*b*) to new code requiring more strict alignment, a padding area 1110 can optionally be inserted based on a computed size to achieve better alignment to a more strict alignment boundary. In accordance with the illustrative embodiments, inserting a padding area 1110 allows code to be generated that references local variables, input and output parameters, spill areas, and so forth, with a known strict alignment based on strict alignment of stack pointer (SP) 1120 and frame pointer (FP) 1130, as well as any other pointers into the stack frame.

While in prior art, references to the incoming arguments and other values in the caller's stack frame can also be made using the stack pointer SP and frame pointer FP registers 1120 and 1130, in accordance with the illustrative embodiments, the caller's stack frame is at an undefined distance from the FP and SP registers 1120 and 1130 due to the statically unknown and dynamically determined size of the padding area 1110. Thus, when references to the caller's stack frame are necessary, a separate and new pointer, e.g., a parameter pointer PP register 1140, is allocated to point to the beginning of the caller's stack frame, whereby references using the parameter pointer PP 1140 can only assume the weaker alignment of the original legacy ABI. In accordance with one embodiment performing memory accesses with a parameter pointer assuming weaker alignment, code sequences are generated to use unaligned load sequences, which may correspond to sequences using multiple memory accesses combined with a merge instruction, a memory instruction special adapted to read or write unaligned data, or other code sequences for performing loads and stores to unaligned addresses.

In accordance with the illustrative embodiments, there is also provided a compilation method to support the improved stack frame organization. FIG. 12 is an example diagram illustrating an example stack alignment compilation operation in accordance with one illustrative embodiment. As shown in FIG. 12, the operation starts with the compiler generating code to align the stack frame by inserting padding for functions preferring more strictly aligned stack frames (step 1210). The amount of padding is computed based on the current alignment and the desired alignment. Thus, for example, when a function requires a stack with an alignment of 256 bits, but the incoming stack is aligned at a multiple of 128 bits, a padding area of 128 bits will be needed. In general, the required padding area can be computed as the difference between the incoming alignment when a function is called, and the called functions actual alignment requirements. This may be accomplished by a subtraction, followed by a masking step, but other implementations are similarly possible. Data in the local stack frame is accessed with more strictly aligned base pointers (step 1220). A separate pointer to a prior stack frame, corresponding to possibly less strict alignment, is maintained in the generate code. The compiler generates code to access data from a possibly less aligned data address (step 1230). The operation then terminates.

Figure 13:
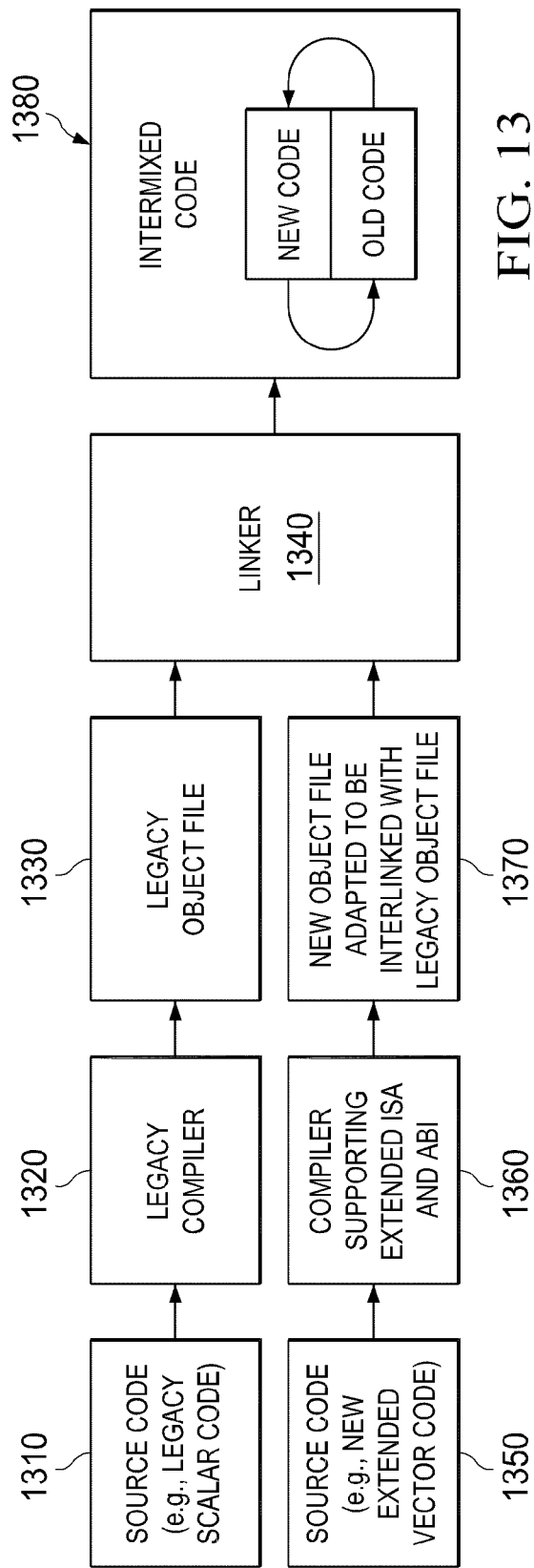
FIG. 13 is an example diagram illustrating an example process by which a compiler generates new code such that it can call legacy code or legacy code can call new code, in accordance with one illustrative embodiment.

FIG. 13 is an example diagram illustrating an example process by which a compiler modifies new code such that it can call legacy code or legacy code can call new code, in accordance with one illustrative embodiment. As shown in FIG. 13, legacy source code 1320, e.g., scalar code, is provided to a (legacy) compiler 1320 generating object code in accordance with a legacy ABI. The object code comprises the legacy object file 1330. The compiler 1320 implements legacy compilation methods and ABIs in the resulting legacy object code 1330. New source code 1350, e.g., extended vector code, is provided to a compiler 1360 adapted to generate code in accordance with a new extended ABI, such as the new extended ABI described herein, using code generation methods such as those described herein above. The compiler 1360 generates object code in accordance with the new extended ABI, thereby generating a new object file 1370. The generation of the new object file 1370 implements the compilation methods and ABIs disclosed herein which are incorporated into the new object code 1370.

A linker 1340 interlinks old and new code without further analysis being necessary as to the calling behavior of the new and old code, since the new code has been compiled with an extended ABI adapted to allow glue-less interlinking of the old and new code. That is, by implementing the mechanisms of the illustrative embodiments, the illustrative embodiments avoid having to have the linker perform analysis of who calls who or implement glue code. All code is adapted to interlink with all other code in accordance with the new extended ABI.

The result of linker 1340 is the intermixed code 1380 in which legacy (old) code and new code may freely call one another while maintaining the data representation expected by each of these types of code. In particular, the linker 1340 leaves the legacy and new capability code 1310 and 1350 unmodified and instead relies on the compiler 1360 having generated new extended capability code 1370 in a manner conducive to free interlinking in accordance with the illustrative embodiments. The generation of this new extended capability code 1370 includes inserting handling registers which may contain, in a single register, portions of a register that are, respectively, preserved and volatile. Furthermore, in one aspect of the illustrative embodiments, this may include selecting function call interfaces in a unified multi-addressable register file in a manner to be compatible with a prior linkage convention of a legacy ABI such that the corresponding registers in the multi-addressable register file are used to allow parameters to be passed between legacy and enhanced function code.

FIG. 14 is a flowchart outlining an example operation for performing compilation of source code to generate new enhanced function code in accordance with the illustrative embodiments such as to allow inter-linkage and generation of mixed old/new code in a single executable code in accordance with one illustrative embodiment. The operation shown in FIG. 14 may be implemented, for example, by a compiler, such as compiler 1360 in FIG. 13, executing in a data processing system on one or more processors of the data processing system.

As shown in FIG. 14, the operation starts with receiving input code (step 1410). The compiler then uses the extended register set of the extended ABI to allocate registers (step 1420). Scalar parameters are allocated in the multi-addressable register file registers corresponding to the original (non-unified) registers storing scalar parameters (step 1430). Vector parameters are allocated in the multi-addressable register file registers corresponding to the original (non-unified) registers storing vector parameters (step 1440).

The compiler allocates data objects, that preferably have a data size that does not exceed a legacy register size, to split caller/callee-saved registers (step 1450). While it is preferable that the data size does not exceed a legacy register size, it is still possible that the data objects may exceed this legacy register size. Spill code, i.e. code that performs any necessary stores to memory and loads from memory, is then generated. The generation of the spill code is performed by determining, for each of the data objects, whether the data object has a data size exceeding the legacy register size (step 1460). If so, spill/reload code is generated for at least the volatile portion of the mixed-preserved/volatile register at the call site in the caller (step 1470). Otherwise, if the data object does not have data size exceeding the legacy register size, then spill/reload code for the caller is generated at the call sites (step 1480). Thereafter, prolog/epilog code is generated to store callee-saved registers (saved in their entirety) and/or register portions (i.e. callee-saved registers that are saved only partially by the callee) in callee (step 1490). The operation then terminates.

It should be appreciated that the compiler may perform various other operations, such as code optimizations and the like, prior to outputting executable code. However, ultimately, the compiler does output executable code that implements the calling conventions, data representations, and utilizes the vector registers of an SVRF in the manner previously described above.

Thus, the illustrative embodiments provide mechanisms for interlinking new code, e.g., extended vector code, with legacy code, e.g., scalar code, such that each may call the other and the expected data formats, as defined by each code's ABI, are provided. The mechanisms of the illustrative embodiments permit such interlinking while maintaining legacy code in an unmodified form and instead performing modifications to the new code to support such interlinking. Moreover, the mechanisms of the illustrative embodiments permit the use of combined scalar-vector register file registers to store both new and legacy code data objects in a compatible manner.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for intermixing code, comprising:
    receiving, in a compiler executing on a processor of the data processing system, source code for compilation using an extended Application Binary Interface (ABI) that extends a legacy ABI and uses a different register configuration than the legacy ABI;
    generating, by the compiler executing on the processor, first compiled code, based on the source code, the first compiled code comprising code for accommodating the difference in register configurations used by the extended ABI and the legacy ABI;
    intermixing, by a linker executing in the data processing system, the first compiled code and second compiled code to generate intermixed code, wherein the second compiled code is compiled code that uses the legacy ABI; and
    outputting, by the linker, the intermixed code, wherein:
    the intermixed code comprises at least one call instruction that is one of a call from the first compiled code to the second compiled code or a call from the second compiled code to the first compiled code, the code for accommodating the difference in register configurations being associated with the at least one call instruction,
    the second compiled code is compiled legacy scalar code and the first compiled code is compiled vector code, and
    in the intermixed code, when the compiled legacy scalar code is called by the compiled vector code, the compiled legacy scalar code only preserves data in a sub-portion of vector slots of a vector register less than all of the vector slots of the vector register, and wherein when the compiled legacy scalar code calls the compiled vector code, the compiled legacy scalar code only operates on the sub-portion of vector slots in the vector register.

2. The method of claim 1, wherein the difference in register configurations is that the register configuration used by the first compiled code have a wider size than registers used by the second compiled code.

3. The method of claim 1, wherein the code for accommodating differences in register configurations stores, by calling code, at least a portion of a register in a first stack frame associated with the calling code and another portion of the register, by callee code, in a second stack frame associated with the callee code.

4. The method of claim 1, wherein register file registers, of a register file, allocated to instructions in the intermixed code comprise a first portion of the register file registers corresponding to the legacy ABI which are callee-saved and a second portion of the register file registers corresponding to the extended ABI which are caller-saved.

5. The method of claim 4, wherein the register file is a multi-addressable register file having a plurality of vector-scalar registers configured to store both data formatted for use with the legacy ABI corresponding to legacy scalar code and data formatted for use with the extended ABI corresponding to vector code.

6. The method of claim 1, wherein the sub-portion of vector slots is a leftmost vector slot in the vector register.

7. The method of claim 1, wherein, in the intermixed code, when the compiled vector code calls the compiled legacy scalar code, data in additional vector slots of the vector register in excess of the sub-portion of vector slots is preserved by the compiled vector code.

8. The method of claim 1, wherein, in the intermixed code, when the compiled vector code calls the compiled legacy scalar code, the compiled vector code passes parameters to the compiled legacy scalar code in the sub-portion of vector slots and receives result data from the compiled legacy scalar code in the sub-portion of vector slots.

9. The method of claim 7, wherein the compiled vector code preserves the data in the additional vector slots in one of a static save area of memory or a stack frame.

10. The method of claim 7, wherein a first portion of the code for accommodating the difference in register configurations, precedes the at least one call instruction and causes the compiled vector code to preserve data in the additional vector slots, and wherein a second portion of the code for accommodating the difference in register configurations, causes the compiled vector code to merge the preserved data in the additional vector slots with result data returned by the compiled legacy scalar code.

11. The method of claim 1, wherein the linker does not perform analysis with regard to calling behavior between the first compiled code and the second compiled code when intermixing the first compiled code and the second compiled code.

12. The method of claim 1, further comprising:
generating stack frame growth code, by the compiler executing on the processor, that grows stack frames by a variable number of bytes to ensure alignment of local data accesses in view of the difference in register configuration used by the legacy ABI and the extended ABI.

13. The method of claim 12, wherein the stack frame growth code grows the stack frames by inserting padding areas into the stack frame.

14. The method of claim 12, wherein generating stack frame growth code further comprises storing, in a parameter pointer register, a parameter pointer that points to a beginning of a caller code's stack frame, the parameter pointer being provided in addition to a stack pointer and a frame pointer.

15. A method, in a data processing system, for intermixing code, comprising:
receiving, in a compiler executing on a processor of the data processing system, source code for compilation using an extended Application Binary Interface (ABI) that extends a legacy ABI and uses a different register configuration than the legacy ABI;
generating, by the compiler executing on the processor, first compiled code, based on the source code, the first compiled code comprising code for accommodating the difference in register configurations used by the extended ABI and the legacy ABI;
intermixing, by a linker executing in the data processing system, the first compiled code and second compiled code to generate intermixed code, wherein the second compiled code is compiled code that uses the legacy ABI;
generating stack frame growth code, by the compiler executing on the processor, that grows stack frames by a variable number of bytes to ensure alignment of local data accesses in view of the difference in register configuration used by the legacy ABI and the extended ABI; and
outputting, by the linker, the intermixed code, wherein generating stack frame growth code further comprises storing, in a parameter pointer register, a parameter pointer that points to a beginning of a caller code's stack frame, the parameter pointer being provided in addition to a stack pointer and a frame pointer, and
references, in instructions of the intermixed code, using the stack pointer and the frame pointer are performed using strict alignment, and references, in instructions of the intermixed code, using the parameter pointer are performed using a less strict alignment than the alignment for references using the stack pointer and the frame pointer.

16. A computer program product comprising a non-transitory computer readable storage medium having a computer readable program recorded thereon, wherein the computer readable program, when executed on a computing device, causes the computing device to:
receive source code for compilation using an extended Application Binary Interface (ABI) that extends a legacy ABI and uses a different register configuration than the legacy ABI;
generate first compiled code, based on the source code, the first compiled code comprising code for accommodating the difference in register configurations used by the extended ABI and the legacy ABI;
intermix the first compiled code and second compiled code to generate intermixed code, wherein the second compiled code is compiled code that uses the legacy ABI; and
output the intermixed code, wherein:
the intermixed code comprises at least one call instruction that is one of a call from the first compiled code to the second compiled code or a call from the second compiled code to the first compiled code, the code for accommodating the difference in register configurations being associated with the at least one call instruction,
the second compiled code is compiled legacy scalar code and the first compiled code is compiled vector code, and
in the intermixed code, when the compiled legacy scalar code is called by the compiled vector code, the compiled legacy scalar code only preserves data in a sub-portion of vector slots of a vector register less than all of the vector slots of the vector register, and wherein when the compiled legacy scalar code calls the compiled vector code, the compiled legacy scalar code only operates on the sub-portion of vector slots in the vector register.

17. The computer program product of claim 16, wherein the code for accommodating differences in register configurations stores, by calling code, at least a portion of a register in a first stack frame associated with the calling code and another portion of the register, by callee code, in a second stack frame associated with the callee code.

18. An apparatus, comprising:

a processor;

a multi-addressable register file coupled to the processor, the multi-addressable register file having a plurality of vector-scalar registers configured to store both data formatted for use with a legacy Application Binary Interface (ABI) corresponding to legacy scalar code and data formatted for use with an extended ABI corresponding to vector code; and a memory coupled to the processor, wherein the memory comprises instructions which, when executed by the processor, cause the processor to:

receive source code for compilation using the extended ABI that extends the legacy ABI and uses a different register configuration than the legacy ABI;

generate first compiled code, based on the source code, the first compiled code comprising code for accommodating the difference in register configurations used by the extended ABI and the legacy ABI;

intermix the first compiled code and second compiled code to generate intermixed code, wherein the second compiled code is compiled code that uses the legacy ABI; and output the intermixed code, wherein:

the intermixed code comprises at least one call instruction that is one of a call from the first compiled code to the second compiled code or a call from the second compiled code to the first compiled code, the code for accommodating the difference in register configurations being associated with the at least one call instruction, the second compiled code is compiled legacy scalar code and the first compiled code is compiled vector code, and in the intermixed code, when the compiled legacy scalar code is called by the compiled vector code, the compiled legacy scalar code only preserves data in a sub-portion of vector slots of a vector register less than all of the vector slots of the vector register, and wherein when the compiled legacy scalar code calls the compiled vector code, the compiled legacy scalar code only operates on the sub-portion of vector slots in the vector register.

19. The apparatus of claim 18, wherein the code for accommodating differences in register configurations stores, by calling code, at least a portion of a register in a first stack frame associated with the calling code and another portion of the register, by callee code, in a second stack frame associated with the callee code.

* * * * *